United States Patent [19]
Noddings et al.

[11] Patent Number: 5,574,814
[45] Date of Patent: Nov. 12, 1996

[54] PARALLEL OPTICAL TRANSCEIVER LINK

[75] Inventors: Kenneth C. Noddings, Austin, Tex.;
Robert C. Gardner, Boston, Mass.;
Thomas J. Hirsch, Austin, Tex.;
Charles L. Spooner, Austin, Tex.;
Michael A. Olla, Austin, Tex.; Jason J. Yu, Austin, Tex.

[73] Assignee: Microelectronics and Computer Technology Corporation, Austin, Tex.

[21] Appl. No.: 381,168

[22] Filed: Jan. 31, 1995

[51] Int. Cl.$^6$ .................................................. G02B 6/36
[52] U.S. Cl. .............................. 385/90; 385/89; 385/94
[58] Field of Search .............................. 385/88–94

[56] References Cited

U.S. PATENT DOCUMENTS

| 4,737,008 | 4/1988 | Ohyama et al. | 38/93 |
| 5,138,679 | 8/1992 | Edwards et al. | 385/90 |
| 5,199,093 | 3/1993 | Longhurst | 385/89 |
| 5,212,754 | 5/1993 | Basavanhally et al. | 385/90 |
| 5,325,455 | 6/1994 | Henson et al. | 385/89 |

FOREIGN PATENT DOCUMENTS

| 4-50902 | 2/1992 | Japan | 385/89 |
| 2106662 | 4/1983 | United Kingdom | 385/89 |

OTHER PUBLICATIONS

"Optical Cabinet Links Being Studied," *Electronic Engineering Times*, Feb. 28, 1994 pp. 53–54.
*Advanced System Interconnection Development*, AT&T RAN, Jan. 14, 1992.
"A Three–Dimensional Mesh Multiprocessor System Using Board–to–Board Free–Space Optical Interconnects," *IEEE* 1993, pp. 278–283.
"Multichannel Transceiver Module Using Plan–Processed Waveguides and Flip–Chip Optoelectronic Components," *IEEE* 1992, pp. 93–97.
"Reliability of a Self–Pulsating CD Laser for Fiber Optic Data Links," *SPIE* vol. 1620, *Laser Testing and Reliability* (1991) pp. 49–59.
*Hitachi 10ch Optical Interconnect Module MCS 2101 MCR 2101*, Oct. 1993.
"Thermal/Electrical Behavior of 1300–nm Quad Laser Arrays in Various Packaging Arrangements," *IEEE* 1992, pp. 88 92.
Conf on Optical Fiber Comm., pp. 153, 1990.
"Optical Computing and Interconnection Networks for Massively Parallel Architecture," *NEC Res. & Develop.*, vol. 32, No. 1, Jan. 1991, pp. 114–129.

(List continued on next page.)

*Primary Examiner*—John Ngo
*Attorney, Agent, or Firm*—Kelly K. Kordzik; Winstead Sechrest & Minick P. C.

[57] ABSTRACT

An assembly of an optical interconnect module adaptable for mating with an optical connector having at least one optical fiber and an alignment pin. A method of assembly includes the steps of (1) mounting an optical device onto a connector body, wherein the connector body is a portion of the optical interconnect module, and wherein the optical device is operable for transmitting or receiving optical signals to/from the optical fiber, (2) inputting a relative position between the alignment pin and an end of the optical fiber, (3) and forming a slot in the connector body by using the measured relative position between the alignment pin and the end of the optical fiber, wherein a relative position between the slot and the optical transceiver mirrors the relative position between the alignment pin and the end of the optical fiber so that the optical device and the end of the optical fiber are substantially aligned to permit transmission of the optical signals when the optical connector and the optical interconnect module are mated, wherein the slot is adaptable for receiving the alignment pin.

17 Claims, 3 Drawing Sheets

OTHER PUBLICATIONS

"Vertical to Surface Transmission Electro–Photonic Device (VSTEP) for Optical Interconnection and Switching Systems," *NEC Res. & Develop.,* vol. 33, No. 3, Jul. 1992, pp. 424–437.

"Design and Performance of Small–Size Optical–Fiber Fanout Connector for Fiber–Ribbon Cable Termination," *The Transactions of the IEICE,* vol. E 72, No. 11, Nov. 1989, pp. 1204–1211.

"Design and Performance of Mass Rusion Splice for Single–Mode Fiber Ribbon," *The Transactions of the IEICE,* vol. E 72, No. 8, Aug. 1989, pp. 912–918.

"Short Distance 8–Channel Parallel Optical Link for Data Communications," *IEEE* 1992, pp. 83–87.

"Integrated Optical Receivers using MSM Detectors," *Journal of Lightwave Technology,* vol. 9, No. 12, Dec. 1991.

"Multichannel Parallel Data Link for Optical Communication," *IEEELTS,* May 1991, pp. 24–32.

PARALLEL OPTICAL TRANSCEIVER LINK

TECHNICAL FIELD OF THE INVENTION

The present invention is related in general to the transmitting and receiving of optical signals, and more particularly, to a connector for converting optical signals into electrical signals and vice versa.

BACKGROUND OF THE INVENTION

Optical fiber has been established as the transmission medium of choice for telecommunications, supporting very high bandwidth over long distances and providing a capability that far exceeds the copper-wire technology it replaces. Research is now looking at a possibility of applying optical interconnect to shorter-distance interconnections within computers, such as board-to-board, module-to-module and chip-to-chip. Other potential applications of optical interconnect are as (1) a cabinet-to-cabinet parallel datacommunications link, (2) a processor interconnect primarily for parallel processors and/or a server interconnect to I/O, such as disk farms or distributed box-to-box, (3) a backplanes/concentrator interconnect for both military and commercial applications, (4) a telecommunications interconnect, such as a centralized switch-to-switch interconnect, and (5) microcell-to-microcell interconnect.

The above potential applications are complicated by the fact that computers are currently feasibly limited to implementations supported by electrical signal transmissions. Computers using substantially optical transmissions are far from being a feasible alternative. Therefore, the integration of optical fiber technology with present-day traditional computer systems requires conversions of signals from optical to electrical and vice versa.

At present, optical transceivers are cost-prohibitive for many applications. Packaging, including optical coupling, of these transceivers represents a significant portion of the link total cost, in many cases over 40% of total cost. Furthermore, the anticipated future applications using parallel optical links to enhance bandwidth through space division multiplexing, and the adding of physical channels, will be even more packaging cost sensitive than current serial implementations, since more channels and components must be integrated into the packaged assembly. A packaging approach that is cost effective promises wider application acceptability.

As a result of the foregoing, there is a need in the art for a cost efficient connector assembly for optical transceivers for the coupling and conversion of optical signals to electrical signals and vice versa.

SUMMARY OF THE INVENTION

The foregoing need is satisfied by the present invention which employs a method of assembling an optical transceiver interconnect module adaptable for receiving an optical connector in a manner so that there is an accurate alignment of the transceiver components and fiber optic cables in an optical connector.

In a preferred embodiment, the optical connector terminates at an end of a ribbon cable of a plurality of optical fibers, which have their ends protruding from a distal end of the optical connector.

In a preferred embodiment, the optical transceiver interconnect module includes a substrate for mounting of transmitter/receiver-related circuitry for receiving signals from a coupled optical signal receiver or for transmitting electrical signals to an optical signal transmitter, which is adaptable for coupling with the optical fibers. An optical receiver device may include a photo diode array ("PDA"). In a preferred embodiment, an optical transmitter device is a vertical cavity surface emitting laser array ("VCSEL") coupled to a sapphire window. These two devices, PDA and VCSEL, will be hereinafter referred to generally as an "optical device."

During assembly of the optical interconnect module, precision alignment of the optical device (e.g., VCSEL) to the ends of the optical fibers when there is a coupling of the optical connector and the optical interconnect module, is accomplished by utilizing the as-manufactured optical connector precision placement of the optical fibers to the connector (tooling) pins. These known manufactured precision placement dimensions are inputted to and used to drive a robotic controlled precision laser drilling stepping system to drill receptor slots for the connector tooling pins in the connector body. The initial reference to drive the laser drilling stepping system is accomplished by first placing the optical device onto the sapphire window connector body assembly with standard pick and place tolerancing and then to obtain a precision receptor slot placement relative to an actual optical feature on the optical device. This initial reference is obtained by using a robotic driven vision system to first find the optical feature on the optical device and then stepping over the known connector tooling pin dimensions to place the laser spot to begin the drilling of the hole.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 1:
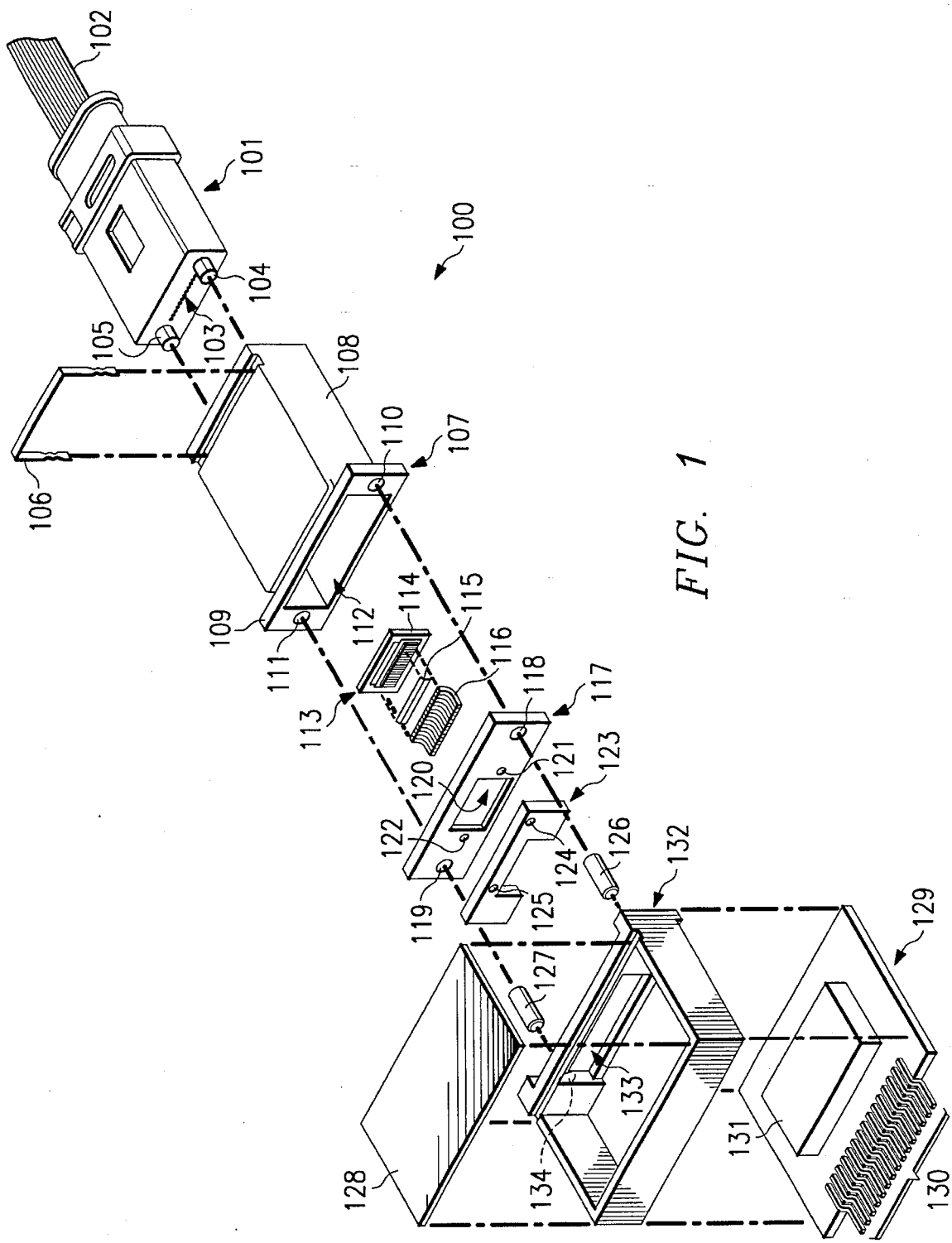
FIG. 1 illustrates an exploded isometric view of the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2:
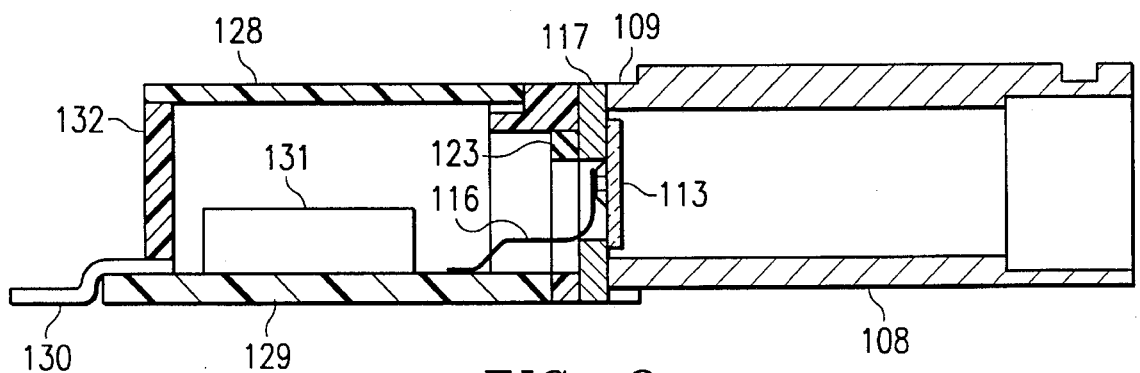
FIG. 2 illustrates a side sectional view of the present invention.

Referring to FIGS. 1 and 2, there are illustrated an exploded view (FIG. 1) and a side sectional view (FIG. 2) of the optical transceiver package 100 of the present invention. The immediate discussion will describe the various parts of the total assembly 100, while a later discussion with reference to FIG. 3 will describe a process for assembling the optical transceiver package 100 in accordance with a preferred embodiment of the present invention.

Connector 101, which mates with package 100, is coupled to fiber optic cable 102, which contains a plurality of optical fibers formed in a ribbon-like construction. Ribbon cable 102 mates with connector 101 in a manner well-known in the art. Ribbon cable 102 may comprise any number of fibers. An example ribbon cable 102 may be purchased from W. L. Gore & Associates, Inc. as part number FOA 8100/*/*, wherein the first asterisk designates the fiber type and the second asterisk designates the number of fibers in the cable. For example, part number FOA 8100/1/12 is a fiber type of 62.5/125/250 having twelve fibers therein.

Connector 101 may comprise any number of well-known connectors adaptable for coupling with ribbon cable 102 and for providing access to the ends 103 of the fibers (arranged in a flat array) from ribbon cable 102 at a distal end of connector 101. Connector 101 also includes connector pins 104 and 105 located on opposing sides of fiber optic cable array 103, which are adapted to assist in aligning array 103 with the optical device discussed further below.

Connector 101 is adaptable for mating within cavity 108 of connector sleeve 107. Retainer 106 is utilized to lock in the mating of connector 101 and connector sleeve 107. However, other well-known means of mating a connector similar to connector 101 with a connector sleeve similar to connector sleeve 107 may be utilized. Such an alternative mating arrangement is available from USCONEC (part no. MTF12MM7), which is commercially available.

When mating connector 101 and package assembly 100, connector 101 is inserted into cavity 108 of connector sleeve 107 so that connector pins 104, 105 and the portion of connector 101 enclosing array 103 protrude from opening 112 of connector sleeve 107. Flange 109 of connector sleeve 107 is adaptable for mating with connector body 117. Such a mating is assisted through the alignment of hole 110 with hole 118 and hole 111 with hole 119 through the use of alignment dowels 126 and 127, respectively.

Connector body 117 is mateable with seal ring 132 through the use of alignment dowels 126 and 127. Dowel 127 inserts through hole 134 in seal ring 132 while alignment dowel 126 mates with a similar hole in seal ring 132 (not shown).

Between connector body 117 and seal ring 132, there resides seal plate 123, which assists in hermetically sealing the cavity provided for by seal ring 132, lid 128, and substrate 129 for enclosing electrical circuit components 131 further discussed below.

Connector body 117 is adaptable for bonding with assembly 113, which comprises sapphire window 114, optical device 115, and flex wire 116. For the remaining discussion, optical device 115 will refer specifically to VCSEL 115. However, VCSEL 115 may be substituted with a photodiode array capable of receiving optical signals and converting them into electrical signals thus allowing the circuitry within the optical interconnect module to be a receiving device as opposed to a transmitting device. Sapphire window 114 provides protection (handling/environmental) when VCSEL 115 is bonded to it. Sapphire window 114 is optically clear to the wavelengths 800–980 nanometers. Furthermore, sapphire window 114 provides a metalized reflow seal mechanism to the Kovar metal parts of the optical interconnect module, which is preferably hermetically sealed. Sapphire window 114 is a durable hard material compared to the GaAs optical devices (VCSEL 115), which provides handling protection to the optical devices because when the small brittle optical device is bonded to the sapphire window 114, sapphire window 114 acts as a larger carrier to facilitate the assembly handling requirements that this optical device must go through. Sapphire window 114 also provides a good scratch resistant contact interface to the plastic optical array connector 101.

VCSEL 115 is an array of Vertical Cavity Surface Emitting Lasers that are electrically bonded through flex wire assembly 116 to electrical circuit components 131. VCSEL 115 receives electrical signals from circuit block 131 and converts these signals into laser pulses, which are then directed to the individual optical fibers within array 103 when connector 101 is mated with assembly 100. Essentially, VCSEL 115 provides a conversion of electrical signals to optical signals.

The electrical signals to VCSEL 115 are manipulated, driven and received by circuitry within circuit block 131. Circuit block 131 may contain well-known circuit components, such as resistors, capacitors, and drivers commonly used within such an assembly. Circuit block 131 may be monolithic or discrete in design. Circuit block 131 is encased by substrate 129, seal ring 132, lid 128 and seal plate 123. External electrical access to the circuits within circuit block 131 is provided by wire assembly 130.

For the correct operation of assembly 100, each of the lasers within VCSEL 115 must be precisely aligned with the corresponding individual optical fibers within array 103 upon mating of connector 101 with assembly 100. A misalignment between the lasers of VCSEL 115 and the fiber ends of array 103 may result in a degraded optical signal, an attenuation of either the optical or electrical signals emanating from that juncture, and/or channel-to-channel crosstalk between fibers.

The present invention enables a precise alignment between VCSEL 115 and array 103 by positioning holes 121 and 122 in alignment with connector pins 104 and 105, respectively. Note that holes 124 and 125, within seal plate 123, are adaptable for receiving pins 104, 105, respectively.

Connector 101 may be formed of a plastic, while connector pins 104 and 105 may be either plastic or metal. Retainer clip 106 may be comprised of berlium copper. Substrate 129 may be a ceramic, such as a low temperature co-fired ceramic (LTCC). Flex 116 is preferably copper or polyamide. The remaining parts of the interconnect module are preferably fashioned out of Kovar metal. However, seal ring 132, seal plate 123 and lid 128 may be replaced with a molded plastic. Substrate 129 then becomes an extension of flex 116 or an epoxy glass substrate that flex 116 is attached to. Moreover, the interconnect module can be manufactured as a standard molded plastic link cable connector constructed to conform to the physical form factors that a standard cable connector would use.

Flex 116 provides a compliant alignment between active optical components, such as VCSEL 115 and fibers 103. Furthermore, the use of flex 116 for the interface between substrate 129 and VCSEL 115 allows for a 90° orientational difference in order to redirect surface sensitive optical components from the horizontal to the vertical. Flex 116 can also be connected to metalized circuit traces within sapphire window 114 instead of directly to VCSEL 115. This connection from VCSEL 115 to flex 116 can be made by wire bond/flipchip/TAB connections from VCSEL 115 to the metalized traces on sapphire window 114.

In a manner further described below, the present invention utilizes the relative position of array 103 with pins 104 and 105 and drills holes 121 and 122 utilizing this relative positioning between array 103 and pins 104 and 105.

Figure 3:
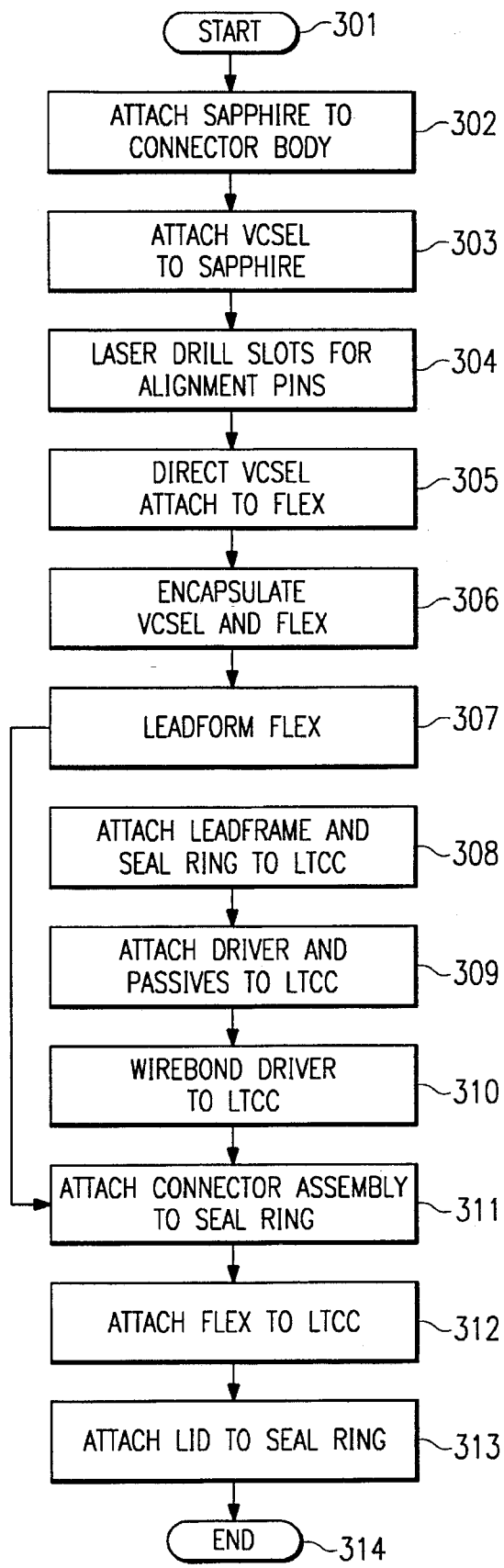
FIG. 3 illustrates a flow diagram of a method of assembling in accordance with the present invention.

Referring next to FIG. 3, there is illustrated a flow diagram of the assembly of optical transceiver 100 adaptable for mating with connector 101. The process begins at step 301 and proceeds to step 302 wherein sapphire window 114 is attached to connector body 117 with a solder reflow at 280° C. using 80 Au/20 Sn solder in conjunction with a reflow oven.

Next, in step 303, the interior of VCSEL 115 is attached to sapphire window 114 with transparent adhesive, while the exterior of VCSEL 115 is attached to sapphire window 114 with a conductive adhesive. A die bonder may be utilized for placement of VCSEL 115 upon sapphire window 114. An ultraviolet lamp may be utilized to cure the above adhesives.

Thereafter, in step 304, holes, or slots, 121 and 122 are drilled using a YAG laser. The relative positioning of pins 104 and 105 with respect to array 103 is available from the manufacturer of connector 101. Utilizing these positional relationships, the YAG laser is then utilized to drill holes 121 and 122 through connector body 117 so that hole 121 is aligned with the array of lasers in VCSEL 115 in the same precise positional relationship as exists between array 103 and connector pin 104. A laser drilling power of 20 watts is required to drill in a Kovar body.

Figure 4:
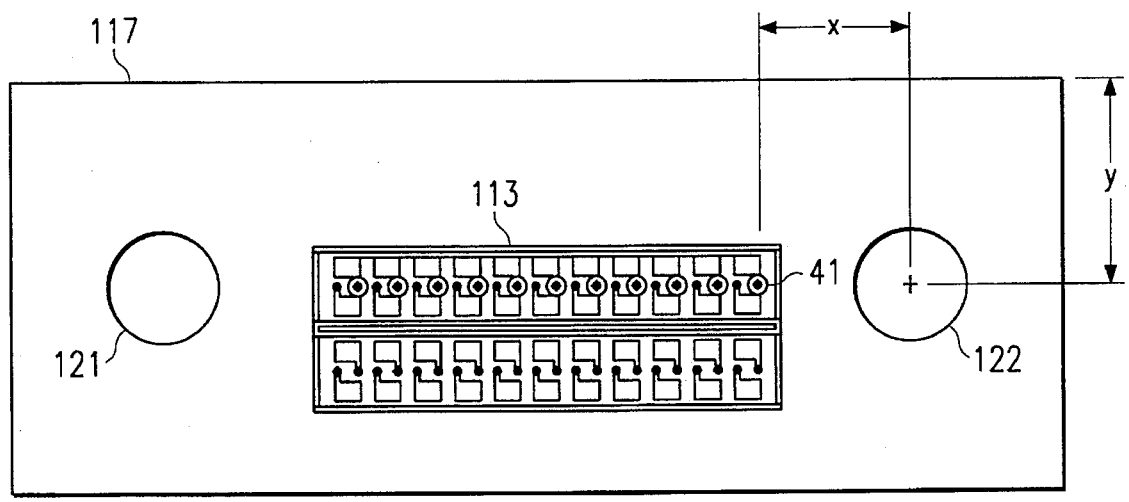
FIG. 4 illustrates a view of the VCSEL mounted on a connector body.

Referring to FIG. 4, there is illustrated connector body 117 with optical device 113 mounted as described in step 303 above. As briefly noted above, the precise positional relationship between the center of connector pin 105 and a particular element 41 (e.g., one of the lasers within VCSEL 115), for example distance X, and the precise positional relationship between the center of connector pin 105 and the top of connector 101, for example distance Y, is available from the manufacturer and may be utilized for a positioning of the YAG laser to drill hole 122. Likewise, hole 121 may be drilled to match with connector pin 104. These known manufactured precision placement dimensions (X and Y) are used to drive a robotic controlled position laser drilling stepping system in order to drill holes 121 and 122. A robotic driven vision system may be utilized to pick out an actual optical feature 41 of optical device 113. The laser drilling system then utilizes a stepping process to position the spot where the laser will drill hole 122 utilizing dimensions X and Y. The laser drilling/vision system may be provided by Flo Rod, part no. MEL-40, which uses a LEE laser with a maximum output of 25 watts. It has a stage resolution of one micron, which enables a total hole dimensional variance to be +/−3 microns.

Similarly, hole 122 is drilled so that it is located in relationship to VCSEL 115 precisely the same as connector pin 105 is positioned with respect to array 103. Note, in step 303, VCSEL 115 has been coupled with sapphire 114, which has been coupled with connector body 117, so that the assembly of connector body 117, VCSEL 115, and sapphire window 114 allows for the drilling of holes 121 and 122 in precise alignment with connector pins 104 and 105.

The purpose of step 304 is to insure that when connector 101 is inserted in mating relationship with assembly 100 that each of the fiber ends of array 103 is in precise alignment with corresponding lasers within VCSEL 115 so that the optical signals arriving via ribbon cable 102 and exiting fiber ends 103 are received with minimal attenuation by corresponding receivers within VCSEL 115, and so that light emitted from the individual lasers of VCSEL 115 are received by the individual fiber ends of array 103. In summary, assembly 113, which includes VCSEL 115, is attached to connector body 117. So that the fiber ends 103 precisely align with the lasers of VCSEL 115, the present invention precisely drills holes 121, 122 so that they precisely match this relative positioning. This precise alignment is provided for each time that connector 101 is mated through connector sleeve 107 with connector body 117 and VCSEL 115 through the mating of pin 104 with hole 121 and pin 105 with hole 122.

Note that holes 121 and 122 may be drilled to be triangular holes. Either circular or triangular holes can be used, however, it has been found that triangular holes can be more precisely shaped by the laser.

Next, in step 305, VCSEL 115 is attached to flex wire assembly 116 utilizing a flip chip bonder or wire bonder with 90 Sn/10 Pb bonding material at 218° C. or Au thermosonic wire bond to a Au pad on VCSEL 115. Flex wire assembly 116 provides for the transmission of electrical signals to and from each of the lasers in VCSEL 115 and circuit block 131. The other ends of wire assembly 116 are coupled to various circuitry within circuit block 131.

Next, in step 306, VCSEL 115 and wire assembly 116 are encapsulated for protection and strain relief using a Hysol 4450 encapsulant.

Next, in step 307, a leadform is utilized to bond in position for attachment of the opposite ends of flex wire assembly 116 to substrate 129, which is preferably a LTCC. In step 308, a Kovar lead frame (the interconnection pattern of leads inside an integrated-circuit package) and seal ring 132 are attached to substrate 129 using solder 220° C. within a reflow oven. The lead frame (not shown) is utilized to couple flex wire frame 116 to the various circuits within circuit block 131, in a manner well-known in the art.

Thereafter, in step 309, if discrete devices are utilized within circuit 131, these various circuit elements, such as drivers and passive devices are attached to the lead frame and substrate 129 with electrically conductive epoxy. In an alternative embodiment, circuitry 131 may be monolithic circuit elements coupled to substrate 129.

Thereafter, in step 310, any driver circuitry utilized within circuitry 131 may be wire bonded to substrate 129 using a wire bonder.

Next, in step 311, connector sleeve 107, VCSEL assembly 113 with connector body 117, seal plate 123 and seal ring 132 are coupled together. Alignment of these portions may be performed utilizing alignment dowels 126 and 127, in a manner as discussed above. Solder reflow using 95 Sn/5 Ag at 240° C. along with a reflow oven is utilized to seal these portions together.

Next, in step 312, single point bonding of the flex assembly 116 to substrate 129 is performed utilizing a thermosonic Au/Au single point bonder.

Next, in step 313, lid 128 is attached to seal ring 132 utilizing solder reflow using 63 Sn/37Pb at 180° C. within a reflow oven. The process then ends at step 314.

Although the present invention and its advantages have been described in detail, it should be understood that various changes, substitutions and alterations can be made herein without departing from the spirit and scope of the invention as defined by the appended claims.

What is claimed is:

1. A method for assembling an optical interconnect module adaptable for mating with an optical connector having at least one optical fiber and an alignment pin, said method comprising the steps of:

mounting an optical device onto a connector body, said connector body being a portion of said optical interconnect module, said optical device operable for transmitting or receiving optical signals to/from said at least one optical fiber;

inputting a relative position between said alignment pin and an end of said at least one optical fiber; and forming a slot in said connector body by using said inputted relative position between said alignment pin and said end of said at least one optical fiber, wherein a relative position between said slot and said optical device mirrors said inputted relative position between said alignment pin and said end of said at least one optical fiber so that said optical device and said end of said at least one optical fiber are substantially aligned to permit transmission of said optical signals between said optical device and said end of said at least one optical fiber when said optical connector and said optical interconnect module are mated, wherein said slot is adaptable for receiving said alignment pin when said optical connector and said optical interconnect module are mated.

2. The method as recited in claim 1, wherein said optical device includes a laser.

3. The method as recited in claim 1, wherein said optical device is a vertical cavity surface emitting laser.

4. The method as recited in claim 1, wherein said optical device includes a photodiode.

5. The method as recited in claim 3, wherein said at least one optical fiber is a portion of an array of optical fibers arranged so that their ends are arranged in an array, said ends exposed at one end of said optical connector, and wherein said vertical cavity surface emitting laser includes an array of lasers, wherein said slot is formed and adaptable for receiving said connector pin so that said array of lasers is aligned with said ends of said array of optical fibers.

6. The method as recited in claim 1, wherein said slot is triangular in shape.

7. The method as recited in claim 1, wherein said slot is formed by a laser.

8. The method as recited in claim 5, wherein said step of mounting an optical device onto a connector body further comprises the steps of:

attaching a sapphire window to said connector body; and attaching said vertical cavity surface emitting laser to said sapphire window, wherein said method further comprises the steps of:

attaching a flex wire assembly to said vertical cavity surface emitting laser; and coupling said vertical cavity surface emitting laser and said flex wire assembly with a circuit package comprising circuitry for transmitting signals said vertical cavity surface emitting laser.

9. The method as recited in claim 1, wherein said optical device includes a metal semiconductor metal detector.

10. An optical interconnect module adaptable for mating with an optical connector having at least one optical fiber and at least one alignment pin, said module comprising:

a connector body;

a vertical cavity surface emitting laser array mounted to said connector body, said vertical cavity surface emitting laser array positioned relative to a slot in said connector body in order to mirror a relative position between said at least one optical fiber and said at least one alignment pin so that upon mating of said optical connector and said optical interconnect module, said vertical cavity surface emitting laser array is substantially aligned with an end of said at least one optical fiber to permit transmission of said optical signals between said vertical cavity surface emitting laser array and said end of said at least one optical fiber when said optical connector and said optical interconnect module are mated, wherein said slot is adaptable for receiving said at least one alignment pin when said optical connector and said optical interconnect module are mated.

11. The module as recited in claim 10, further comprising:

flexible interconnect means for providing compliant alignment between said vertical cavity surface emitting laser array and said at least one optical fiber.

12. The module as recited in claim 10, further comprising:

flexible interconnect means for coupling said vertical cavity surface emitting laser array to circuitry mounted on a substrate so that said vertical cavity surface emitting laser array and said substrate are oriented at substantially 90° from each other.

13. The module as recited in claim 12, further comprising metalized traces for bonding said flexible interconnect means to said vertical cavity surface emitting laser array.

14. An optical interconnect module adaptable for mating with an optical connector coupled to a ribbon cable of optical fibers at one of said optical connector, wherein ends of said optical fibers are exposed at a second end of said optical connector as an array of optical fiber ends, and wherein said second end of said optical connector includes a pair of alignment pins positioned on either side of said array of optical fiber ends, said optical interconnect module comprises:

a connector sleeve adaptable for receiving and locking with said optical connector;

a connector body coupled to said connector sleeve;

a sapphire window coupled to said connector body;

a VCSEL coupled to said sapphire window;

means for receiving said pair of alignment pins, wherein said receiving means are positioned so that said VCSEL is substantially aligned with said array of optical fiber ends to permit transmission of optical signals between said VCSEL and said array of optical fiber ends when said optical connector and said optical interconnect module are mated;

a hermetically sealed module, including a substrate;

means for coupling said hermetically sealed module to said connector body;

driver circuitry mounted on said substrate;

a wire assembly coupled to said driver circuitry; and means for coupling said driver circuitry to said VCSEL.

15. The method as recited in claim 1, wherein said slot is a hole in said connector body, and wherein said forming step further comprises the step of drilling said hole in said connector body by using said inputted relative position between said alignment pin and said end of said at least one optical fiber.

16. The method as recited in claim 15, wherein said drilling step is performed by a laser.

17. The method as recited in claim 1, wherein said step of mounting an optical device onto said connector body further comprises the steps of:

attaching a sapphire window to said connector body; and attaching said optical device to said sapphire window.

\* \* \* \* \*